Sept. 21, 1926.                    W. C. BUTTNER                    1,600,713
                                      TORCH
                                Filed July 31, 1924
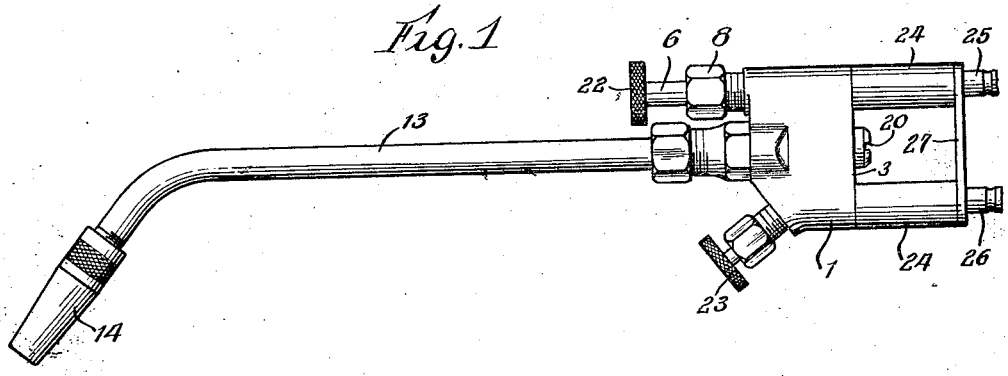
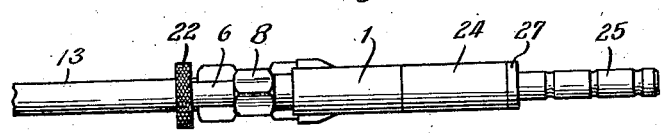
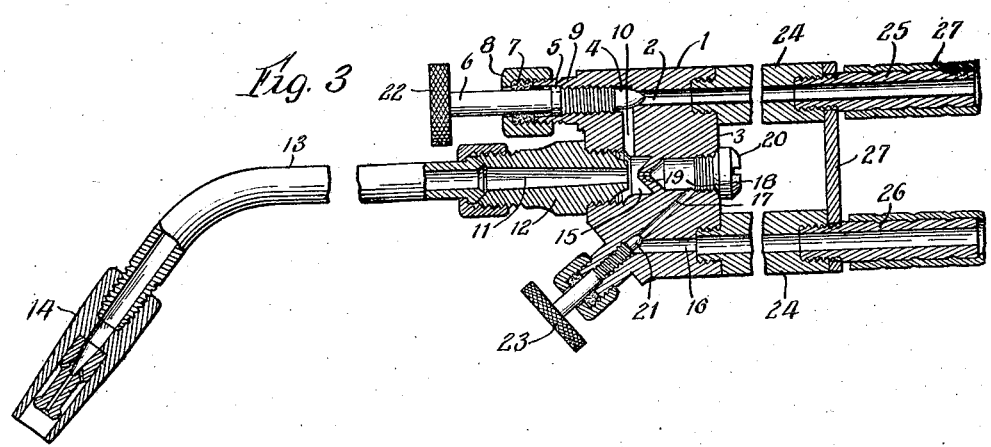
Inventor:
William Carl Buttner
By: Wm O. Bell
                atty.

Patented Sept. 21, 1926.

1,600,713

UNITED STATES PATENT OFFICE.

WILLIAM CARL BUTTNER, OF CHICAGO, ILLINOIS, ASSIGNOR TO THE BASTIAN-BLESSING COMPANY, OF CHICAGO, ILLINOIS, A CORPORATION OF ILLINOIS.

TORCH.

Application filed July 31, 1924. Serial No. 729,226.

This invention relates to a novel and improved torch particularly adapted for use in lead burning, soldering, brazing, etc., and has for one of its important objects the provision of a torch which is light in weight, and which is readily held in the hand.

A further object is to provide a torch in which the valves controlling the flow of gases may be readily operated.

A further object is to provide a torch having means for obtaining a better mixture than is customarily had in a device of this character.

A further object is to provide a torch having means to prevent the escape of inflammable gas therefrom.

Further objects will become apparent during the progress of the description.

In the drawings accompanying this specification, I have shown a selected embodiment of the invention, and referring thereto—

Fig. 1 is an elevation of my improved torch.

Fig. 2 is a plan view thereof, and

Fig. 3 is a longitudinal section thereof.

In the drawings, the numeral 1 designates a suitable body having a bore 2 therein for the passage of an inflammable gas. As shown, this bore extends perpendicularly in the body from the rear end 3 thereof, and the forward end of the bore 2 is enlarged to receive a screw-threaded needle valve 4. The stem of the needle valve immediately above the screw-threaded portion is recessed to receive a horse-shoe collar 5, or the like. Surrounding the stem 6 of the needle valve is suitable packing 7 held in place by a cap 8 screw-threaded on to the extension 9 of the body. It will thus be evident that upon continued turning of the stem 6 to withdraw it from the body, the collar 5 will come in contact with the packing 7 and prevent removal of the stem.

A bore 10 is provided extending at an angle to the bore 2 and communicating therewith, whereby the inflammable gas may pass to the mixing throat 11. The mixing throat is formed in a member 12 which may be screw-threaded into the body 1 as shown, and this member 12 is provided with a pipe 13 having a suitable tip 14.

Adjacent the inner end of the mixing throat 11 I provide a recess 15 in the body 1. This recess is preferably of the form shown, having a cone with an aperture 19 passing through the apex thereof, and directed into the mixing throat. It will be noted that the bore 10 communicates with this recess 15 and terminates therein.

To supply oxygen or compressed air to the torch, I provide a bore 16 in the body 1 communicating with a bore 17 terminating in a recess 18, and from the recess 18 the oxygen or compressed air may pass through the aperture 19 in the apex of the cone-shaped wall of the recess 15. It will be seen that this aperture 19 is the one referred to above as being directed toward and into the mixing throat 11. The recess 18 preferably extends through the rear end 3 of the body and may be closed by a removable plug 20. By this means ready access may be had to the recess 18 in order to clean the aperture 19. This aperture I shall refer to hereafter as the jet hole, as it is adapted to form a jet of oxygen or compressed air. The flow of oxygen or compressed air is controlled by a needle valve 21. It may be noted at this time that both the needle valves 4 and 21 are provided with suitable handles 22 and 23 extending in front of the body and in a position to be easily manipulated by a person holding the torch in one hand.

The rear end of the body 1 is provided with suitable extensions 24 having passages therethrough communicating with the bores 2 and 16 respectively. These extensions are of such a length as to furnish a suitable means for clasping the entire torch in one hand, and when so clasped, the needle valves are easily reached with the other hand for manipulation as just pointed out. The rear ends of the extensions 24 receive the inlet nipples 25 and 26 for the supply of gas and oxygen or compressed air respectively. These nipples may be threaded into the extensions 24 and joining the rear end of the extensions is a cross-piece 27 which acts as a strengthening piece for the extensions and therefore forms a rigid handle. Suitable hose 27 may be received on the nipples 25 and 26 and extend to suitable sources of gas and compressed air or the like.

In operation, oxygen or compressed air is admitted through bores 16 and 17 to the recess 18, whence it passes through the jet hole 19 in a jet, passing into the mixing throat 11 at high velocity. It should be noted that the bores 16 and 17 are of progressively less cross-sectional area and that the jet hole 19 is of still smaller cross-sectional area, whereby the velocity of the oxygen or compressed air is progressively increased. The inflammable gas is supplied through the bores 2 and 10 to the recess 15, where it is acted upon by the jet of oxygen or compressed air from the jet hole 19. This jet results in a siphon action on the gas to induce a better flow thereof, and furthermore by injecting a jet of oxygen into the stream of gas a much better mixture is obtained. The recess thus constitutes a siphon chamber in which the inflammable gas is introduced at the side and the oxygen or compressed air is introduced at high velocity through the jet hole at the back and in alignment with the elongated mixing throat 11, whereby the oxygen or compressed air carries the inflammable gas forward into the mixing throat where the mixing is completed for combustion.

While I have referred to the supply of oxygen or compressed air, for simplicity of expression, I will refer to this gas as oxygen throughout the claims, it being understood that by that term is meant any gas which contains oxygen, and which will support the combustion of the inflammable gas.

From the above, it will be apparent that I have provided a novel and improved torch which is extremely compact and can be made extremely light in weight; which can be readily held in the hand; wherein the valves controlling the flow of gases are easily manipulated by a person holding the torch in one hand; and wherein there is no danger of escape of inflammable gas due to displacement of the valve controlling its flow; and wherein a thorough mixture is assured.

I am aware that changes in the form, construction and arrangement of parts may be made without departing from the spirit and without sacrificing the advantages of the invention and I reserve the right to make all such changes as fairly fall within the scope of the following claims:

I claim—

1. A torch comprising a body having a siphon chamber therein, a mixing throat connecting to said chamber at the front thereof, a valved gas passage in said body connected to the side of said siphon chamber, a recess in the body back of the siphon chamber, a valved oxygen passage connected to said recess, said passages being disposed on either side of said chamber, and a jet hole connecting the recess with the siphon chamber and arranged in alignment with the mixing throat said siphon chamber being located in the body between said passages.

2. A torch comprising a body having a siphon chamber therein, a mixing throat connecting to said chamber at the front thereof, a right angle gas passage in said body connected to the side of said siphon chamber, a valve at the front of the body engaging said gas passage at the angle therein, a recess in the body back of the siphon chamber, an angular oxygen passage in the side of the body opposite the gas passage and connected to said recess, a valve at the front of the body engaging said oxygen passage at the angle therein, and a jet hole connecting the recess with the siphon chamber and arranged in alignment with the mixing throat.

WILLIAM CARL BUTTNER.